United States Patent [19]

Ichinoi

[11] Patent Number: 4,613,905
[45] Date of Patent: Sep. 23, 1986

[54] VIDEO NOISE REDUCTION CIRCUIT HAVING IMPROVED TRANSIENT CHARACTERISTICS

[75] Inventor: Yutaka Ichinoi, Yokohama, Japan

[73] Assignee: Victor Company of Japan, Limited, Yokohama, Japan

[21] Appl. No.: 800,105

[22] Filed: Nov. 22, 1985

Related U.S. Application Data

[63] Continuation of Ser. No. 484,992, Apr. 14, 1983, abandoned.

[30] Foreign Application Priority Data

| Apr. 15, 1982 [JP] | Japan | 57-62814 |
| Apr. 15, 1982 [JP] | Japan | 57-62815 |
| Apr. 15, 1982 [JP] | Japan | 57-62816 |
| Apr. 15, 1982 [JP] | Japan | 57-62817 |

[51] Int. Cl.$^4$ ............................................. H04N 5/21
[52] U.S. Cl. ........................................ 358/167; 358/36
[58] Field of Search .............. 358/36, 39, 167, 340, 358/905; 455/296, 303, 304, 307, 308

[56] References Cited

U.S. PATENT DOCUMENTS

| 4,302,768 | 11/1981 | Kamura | 358/167 |
| 4,393,396 | 7/1983 | Raven | 358/36 |

Primary Examiner—Tommy P. Chin
Attorney, Agent, or Firm—Cushman, Darby & Cushman

[57] ABSTRACT

In a noise reduction circuit an input video signal is applied to a pair of low-pass filters having high and low time constant values to reject noise components, the noise-free output of the low-pass filter having the smaller time constant being scaled down and combined with the noise-free output of the filter having the high constant value. The input video signal is concurrently delayed with respect to the signal applied to the low-pass filters and applied to a differential amplifier where a difference between them is detected and fed to a limiter to generate an offset voltage. This offset voltage is destructively combined with the delayed video signal.

3 Claims, 5 Drawing Figures

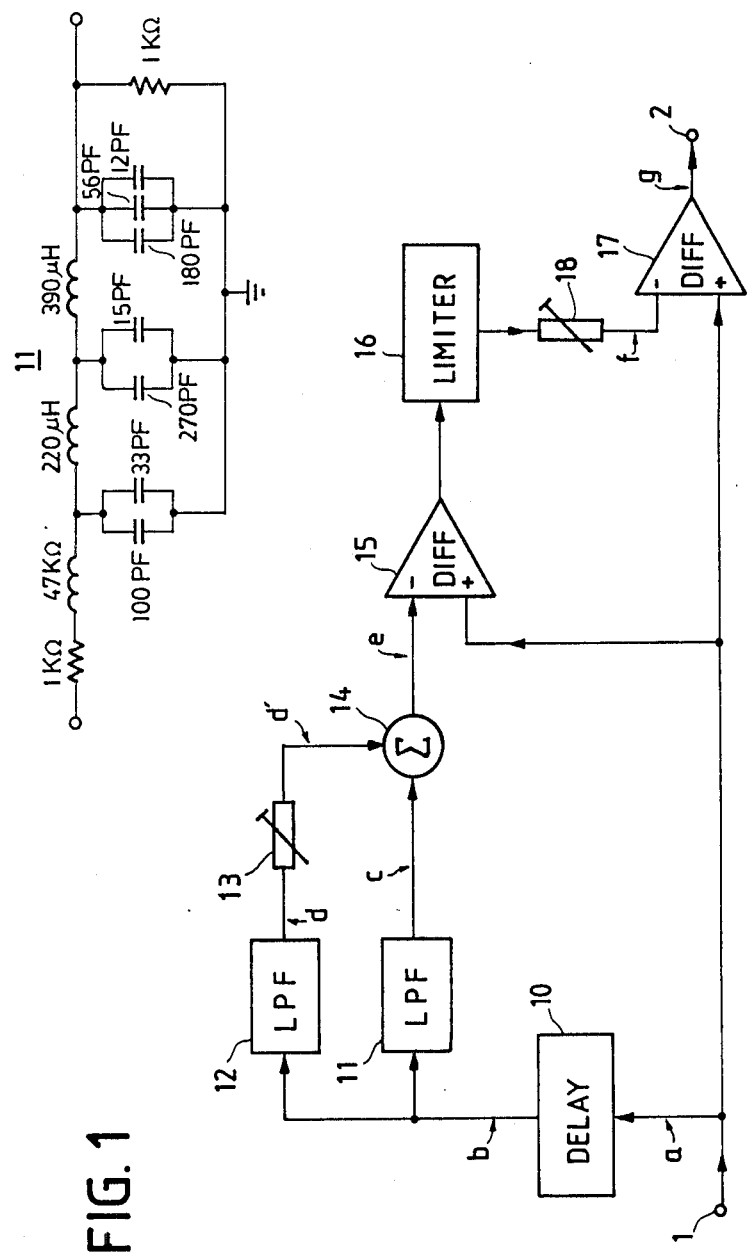

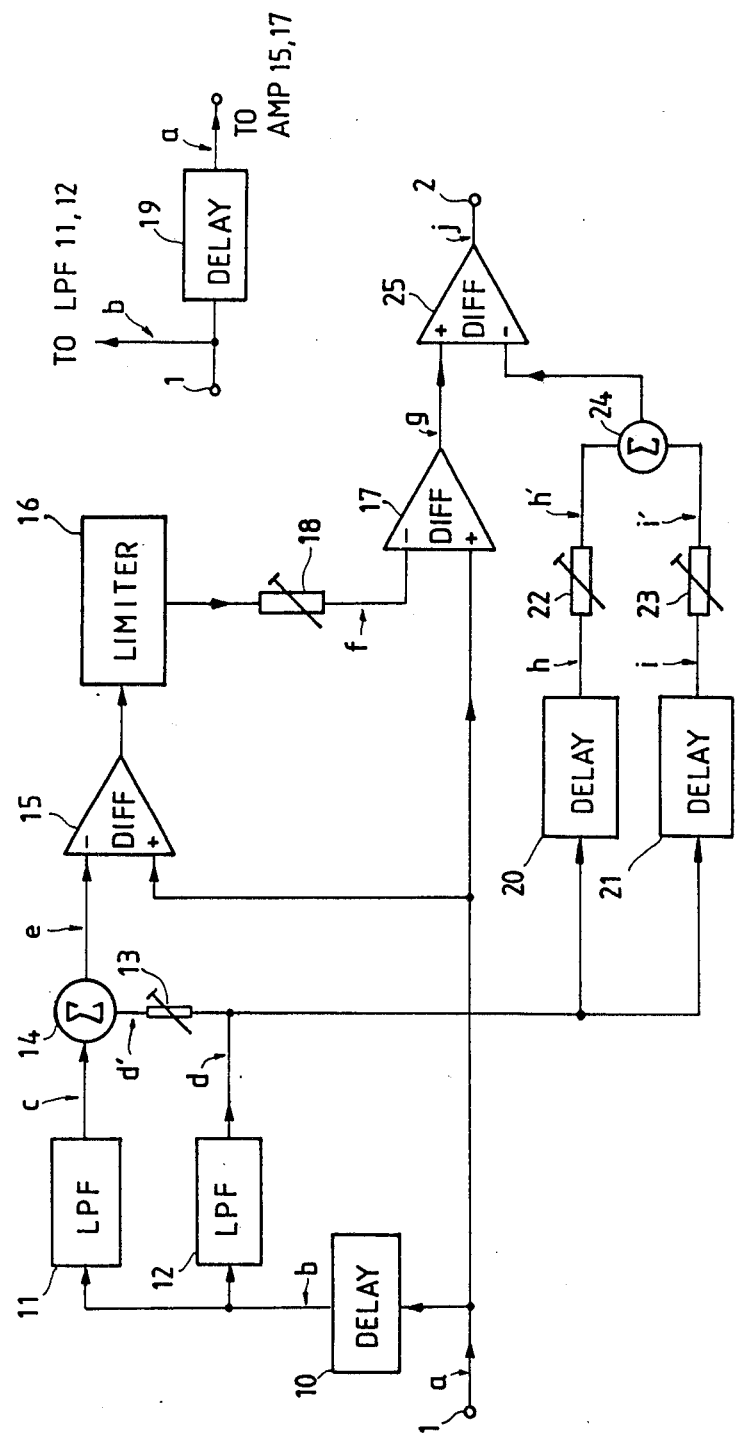

VIDEO NOISE REDUCTION CIRCUIT HAVING IMPROVED TRANSIENT CHARACTERISTICS

This is a continuation of application Ser. No. 484,992, filed Apr. 14, 1983 which was abandoned upon the filing hereof.

BACKGROUND OF THE INVENTION

In a prior art video noise reduction circuit, shown and described in Copending U.S. patent application Ser. No. 389,041, filed June 16, 1982, titled "Noise Reduction Circuit for Video Signals", invented by A. Hirota and assigned to the same assignee as the present invention, the input video signal is filtered through a low-pass filter to reject noise components. Concurrently, the input video signal is delayed with respect to the signal applied to the low-pass filter and desctructively combined with the output of the filter to provide a difference signal to a limiter to generate an offset voltage. This offset voltage is combined with the non-delayed video input signal.

However, due to the large value of rise time involved in the low-pass filter, the prior art noise reduction circuit generates an unwanted white area before the occurrence of a black-to-white transition and an unwanted black area before the occurrence of a white-to-black transition. The latterblack area is particularly noticeable and degrades image quality.

SUMMARY OF THE INVENTION

It is therefore an object of the present invention to provide a video noise reduction circuit which improves image quality by reducing or eliminating the preceeding whites and blacks while retaining the capability to reduce high frequency noise.

The noise reduction circuit embodying the invention comprises filter means for passing a video signal therethrough, means for delaying the video signal, means for detecting the difference between the delayed video signal and the output signal of the filter means and generating therefrom a difference signal, a limiter having a predetermined slice level for rejecting the portion of the difference signal higher than the level to generate an offset voltage, and means for combining the offset voltage with the first circuit signal.

According to the invention, the noise reduction circuit further comprises a waveform generating means responsive to the video signal for generating a waveform having an uphill slope rising immediately following a transition of the video signal from a first level to a second level and a downhill slope falling immediately following a transition of the video signal from the second level to the first level, the waveform being combined with the delayed signal as a portion of the offset voltage.

Preferably, the waveform is generated by a circuit including second filter means having a smaller time constant than the time constant of the first filter means for passing the video signal therethrough, means for attenuating the output signal of the second filter means relative to the output signal of the first filter means, and means for summing the attenuated signal with the output of the first filter means. The input video signal is concurrently delayed with respect to the signal applied to the first and second filter means and destructively combined with the output of the summing means to generate the difference signal.

Preferably, the waveform is supplemented by an additional signal which is generated by second delay means for delaying the output of the second filter means and a second attenuating means to scale down the output of the second delay means. The supplemented waveform is substantially complementary to the delayed video signal.

BRIEF DESCRIPTION OF THE DRAWINGS

The present invention will be described in further detail with reference to the accompanying drawings, in which:

FIG. 1 is a block diagram of a first embodiment of the present invention;

FIG. 2 is a detail of a low-pass filter of FIG. 1;

FIG. 4 is an illustration of an alternative embodiment; and

FIG. 5 is a block diagram of a second embodiment of the invention. de

DETAILED DESCRIPTION

Figure 3:
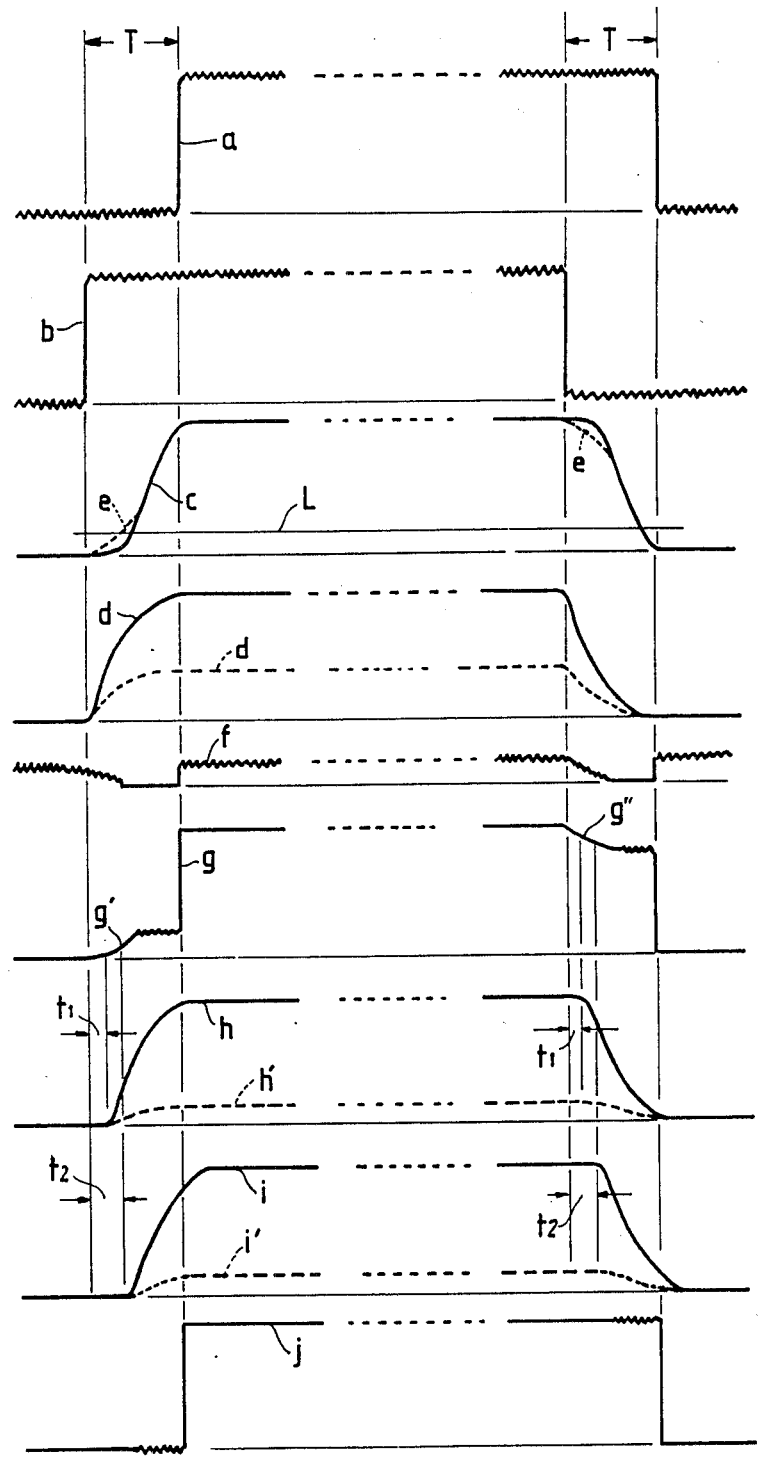
FIG. 3 is a waveform diagram useful of describing the operation of the invention.

Referring now to FIG. 1, there is shown a noise reduction circuit according to a first preferred embodiment of the present invention. The circuit is adapted to receive a frequency-demodulated luminance signal at an input terminal 1 and deliver a noise-compensated output signal to an output terminal 2. The noise reduction circuit comprises a delay circuit 10 and low-pass filters 11 and 12. The low-pass filter 11 is designed with a Bessel function, a typical example of which is shown in FIG. 2 and which is characterized by a constant rise time, typically in a range between 0.5 to 2 microseconds. The low-pass filter 12 is, on the other hand, an RC filter having a smaller delay time than that of filter 11.

The delay circuit 10 is coupled to the input terminal to introduce a delay time of a horizontal line scan period minus T which may be the inherent rise time of the delay circuit and substantially equals the rise time of the low-pass filter 11. The noise-affected input luminance signal, shown at a in FIG. 3, is delayed by the circuit 10 so that the output of this circuit appears as a waveform b having a black-to-while transition which occurs at a point delayed by the interval T with respect to the black-to-white transition of signal a of the next horizontal period.

The output of the delay circuit 10 is applied to the filters 11 and 12 where the noise component of the video signal is rejected. The noise-free output of filter 11 is applied to an input of an adder 14 as a signal c, and the noise-free output of filter 12 is applied as a signal d to an attenuator 13 and thence to a second input of the adder 14 as a signal d'. Due to the greater time constant value than filter 12, the output c of the filter 11 rises linearly at a point delayed with respect to the rising edge of signal b, while the output of the filter 12 has an exponential rising edge which occurs earlier than the linear rising edge of the output of filter 11. The signal d is appropriately scaled down by the attenuator 13 relative to the signal c. The signals c and d' summed in the adder 14, producing a combined signal e. The latter signal is applied to the negative input of a differential amplifier 15 and combined with the signal a applied to the positive input thereof. Therefore, a difference between the signals a and e is detected and applied to a limiter 16 having a slice level shown at L in FIG. 3 to generate an offset voltage f. This offset voltage is applied to a negative input of a differential amplifier 17 which takes its positive input from the input terminal 1. As indicated by a waveform g in FIG. 3, the output of the differential amplifier 17 has a black-to-white transition which corresponds to the black-to-white transition of signal a and a front porch having a preceding edge g' which rises from the black level. Due to the compensation by the edge of the signal d which rises immediately following the black-to-white transition of signal b, the preceding edge g' rises at a reduced rate in response to that transition.

With respect to the white-to-black transition of the input signal a, the signals a and b have opposite voltage relationship to the previous relationship. Therefore, the signal g sags in response to the white-to-black transistion of signal b with a gradually decreasing rate forming an edge g" and levels off to form a back porch before it sharply falls to the black level.

Preferably, an attenuator 18 is provided in the output circuit of the limiter 16. This attenuator is used for making adjustment on the limiter's output signal f having an amplitude lower than the limiter's slice level in relation to the amplitude of signal a applied to the differential amplifier 17. If the signals a and f have a voltage ratio of 1:1, the noise components can be fully suppressed, and if this ratio is 1:0.7, the level of the front and back porches can be decreased, although the noise suppression may be somewhat degraded. However, the 1:0.7 ratio setting is advantageous since it makes the image appear to have reduced luminance at black-and-white borders and appear to have a well balanced proportion of luminance over the whole screen.

As an alternative embodiment, a delay circuit 19 having a delay time T could equally be as well used instead of the delay circuit 10 as shown in FIG. 4. This delay circuit 19 is connected in a circuit between the input terminal 1 and the positive terminals of the differential amplifiers 15 and 17. The input video signal at terminal 1 is directly applied to the low-pass filters 11 and 12 as a signal b and the output of the delay circuit 19 is applied to the amplifiers 15, 17 as a signal a.

FIG. 5 is an illustration of a second embodiment of the invention in which parts corresponding to those in FIG. 1 are marked with the same numerals as used in FIG. 1. The second embodiment differs from the first embodiment in that it additionally includes a pair of delay circuits 20 and 21 having their inputs coupled together to the output of the low-pass filter 12, a pair of attenuators 22 and 23 respectively coupled to the outputs of the delay circuits 20 and 21, and a differential amplifier 25 having a positive input coupled to the output of the differential amplifier 17, the outputs of the attenuators 22 and 23 being combined at an adder 24 and supplied to the negative input of the differential amplifier 25. The delay circuits 18 and 19 have different values of delay times determined in relation to the rise time and the voltage levels of the front and rear edges g' and g" of the signal g. More specifically, the delay circuit 20 introduces a delay time $t_1$ to the signal d so that the rising edge of its output signal h coincides with a lower voltage level of the front edge g' and its falling edge coincides with a higher voltage level of the rear edge g" (see FIG. 3). On the other hand, the delay circuit 21 introduces a delay time $t_2$ so that the rising edge of its output signal i coincides with a higher voltage level of the front edge g' and its falling edge coincides with a lower voltage level of the rear edge g".

The delayed signals h and i are scaled down to a value typically in a range between 2% to 7% of the original level by attentuators 22 and 23 to generate offset voltages h' and i'. These offset voltages are summed in the adder 22 and combined with the signal g to offset its front and back porches to generate an output as shown at j.

What is claimed is:

1. A noise reduction circuit having an input terminal to which a video signal is applied and an output terminal, comprising:
    a noise rejection low-pass filter having a predetermined rise time for rejecting noise introduced in the video signal applied to said input terminal;
    waveform shaping means comprising a second low-pass filter having a rise time smaller than said predetermined rise time and an attenuator connected in series therewith for generating an output signal having an uphill slope portion during a transition of the video signal from a first level to a second level and a downhill slope portion during a transition from said second level to said first level;
    an adder for summing the output signal of the noise-rejection filter and the output signal of said wave-shaping means;
    a first differential amplifier having a first input terminal responsive to an output signal from said adder and a second input terminal;
    means connecting the input terminal of the noise reduction circuit to said first and second low-pass filters and to the second input terminal of said first differential amplifier, said connecting means including delay means for introducing a delay so that a video signal applied to said first and second low-pass filters is advanced by an amount equal to said predetermined rise time with respect to a video signal applied to said second input terminal of said first differential amplifier;
    a limiter connected to the output of said first differential amplifier to detect small-amplitude noise; and
    a second differential amplifier having a first input terminal responsive to said small-amplitude noise and a second input terminal responsive to the video signal applied to said input terminal of the noise reduction circuit for canceling noise in said video signal.

2. A noise reduction circuit as claimed in claim 1, further comprising:
    second waveform shaping means connected from the output of said second low-pass filter for generating an output signal; and
    a third differential amplifier for combining the output signals of said second differential amplifier and the output signal of said second waveform shaping means to generate a noise-suppressed video signal to be applied to said output terminal of the noise reduction circuit.

3. A noise reduction circuit as claimed in claim 2, wherein said second waveform shaping means comprises:
    second and third delay circuits having different delay times; and
    second and third attenuators respectively connected in series with said second and third delay circuits from the output of said second low-pass filter to generate first and second portions of the output signal of said second waveform shaping means; and
    a second adder for summing said first and second portions to generate the output signal of said second waveform shaping means and applying the last-mentioned output signal to said third differential amplifier.

* * * * *